(12) United States Patent
Johansson et al.

(10) Patent No.: US 8,057,132 B2
(45) Date of Patent: Nov. 15, 2011

(54) INDEXABLE MILLING INSERT

(75) Inventors: Jan Johansson, Sandviken (SE); Anders Liljerehn, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 367 days.

(21) Appl. No.: 12/488,732

(22) Filed: Jun. 22, 2009

(65) Prior Publication Data

US 2010/0003090 A1 Jan. 7, 2010

(30) Foreign Application Priority Data

Jul. 7, 2008 (SE) ........................................ 0801629

(51) Int. Cl.
*B23C 5/20* (2006.01)

(52) U.S. Cl. .............................. 407/113; 407/42; 407/48

(58) Field of Classification Search ..................... 407/40, 407/42, 43, 48, 113; *B23C 5/20*
See application file for complete search history.

(56) References Cited

U.S. PATENT DOCUMENTS

| | | | | |
|---|---|---|---|---|
| 5,052,863 A * | 10/1991 | Satran | ............................ | 407/113 |
| 5,071,292 A * | 12/1991 | Satran | ............................ | 407/116 |
| 5,078,550 A * | 1/1992 | Satran et al. | ..................... | 407/34 |
| 5,145,295 A * | 9/1992 | Satran | ............................ | 407/113 |
| 5,207,538 A * | 5/1993 | Satran | ............................ | 407/113 |
| 5,383,750 A * | 1/1995 | Satran et al. | ..................... | 407/113 |
| 5,593,255 A * | 1/1997 | Satran et al. | ..................... | 407/113 |
| 5,597,271 A * | 1/1997 | Men et al. | ....................... | 407/113 |
| 5,853,267 A * | 12/1998 | Satran et al. | ..................... | 407/113 |
| 6,142,716 A * | 11/2000 | Jordberg et al. | ............... | 407/114 |
| 6,196,770 B1 * | 3/2001 | Astrom et al. | ................... | 407/40 |
| 6,293,737 B1 * | 9/2001 | Satran et al. | ................... | 407/113 |
| 7,014,395 B2 * | 3/2006 | Daiguji et al. | ................. | 407/113 |
| 7,040,844 B1 * | 5/2006 | Daiguji | ........................... | 407/113 |
| 7,281,884 B2 * | 10/2007 | Maeda et al. | ................... | 407/113 |
| 2003/0170079 A1 * | 9/2003 | Daiguji et al. | .................... | 407/34 |

FOREIGN PATENT DOCUMENTS

| | | |
|---|---|---|
| EP | 0 956 921 A2 | 11/1999 |
| SE | 527 617 | 4/2006 |
| WO | WO 02/055245 | 7/2002 |
| WO | WO 2006/041353 | 4/2006 |

* cited by examiner

*Primary Examiner* — Boyer D Ashley
*Assistant Examiner* — Sara Addisu
(74) *Attorney, Agent, or Firm* — Drinker Biddle & Reath LLP

(57) ABSTRACT

An indexable milling insert, including an upperside, an underside parallel to an imaginary reference plane, and two cutting edges. Each cutting edge includes a cutting edge line and is formed between a chip surface included in the upperside and a first clearance surface extending between the upperside and the underside, the first clearance surface forming an acute, nominal first clearance angle ($\alpha$) with a normal to the reference plane. Each cutting edge includes a main edge, which is at least partly convexly curved as viewed in plane elevation from above, and which extends from an initial end, which determines the maximal cutting depth of the milling insert, to a corner edge having a radius of curvature that is smaller than the radius of curvature of the main edge, the main edge rising in the direction from the initial end toward the corner edge such that the distance thereof to the underside successively increases in the direction. A second clearance surface is formed between the cutting edge line and the first clearance surface, the second clearance surface having a width of at most 0.3 mm and a nominal second clearance angle ($\lambda$) that is smaller than the first clearance angle. The second clearance surface is of uniform width and the second clearance angle decreases successively in the direction from the initial end toward the corner edge.

8 Claims, 11 Drawing Sheets

INDEXABLE MILLING INSERT

This application claims priority under 35 U.S.C. §119 to Swedish Patent Application No. 0801629-7, filed on Jul. 7, 2008, which is incorporated by reference herein in its entirety.

FIELD OF THE INVENTION

The present invention relates generally to an indexable milling insert of the type that includes an upperside, an underside parallel to an imaginary reference plane, and two cutting edges, which individually include a cutting edge line and are formed between a chip surface included in the upperside and a first clearance surface extending from the upperside toward the underside. The clearance surface forms an acute, nominal first clearance angle with an arbitrary normal to the reference plane. The individual cutting edge includes a main edge, which is at least partly convexly curved as viewed in plane elevation from above, and which extends from an initial end that determines the maximal cutting depth of the milling insert, to a corner edge having a radius of curvature that is smaller than the radius of curvature of the main edge. The main edge rises in the direction from the initial end toward the corner edge by the fact that the distance thereof to the underside successively increases in the direction. A second clearance surface is formed between the cutting edge line and the first clearance surface, which has a width of at most 0.3 mm and a nominal second clearance angle that is smaller than the first clearance angle.

BACKGROUND OF THE INVENTION

Generally, milling tools and the milling inserts thereof are used for chip removing or cutting machining of workpieces of various metallic materials, such as steel, aluminum, titanium, etc., which in practice have most varying properties in respect of, for instance, workability, generation of heat, sticking, and so on. Milling inserts of the kind initially mentioned (known as "router inserts" by those skilled in the art) are especially suitable for milling in easily machined materials, such as aluminum, in which the milling inserts have great cutting capacity and generate the smoothest possible surfaces. For this reason, the milling inserts are manufactured having a positive cutting geometry so far that the cutting edge angle between the individual chip surface and the appurtenant clearance surface is acute (e.g., within the range of 65-75°), at the same time as the milling inserts are mounted with positive tipping-in angles in the appurtenant seatings in the milling cutter body as viewed axially as well as radially. In such a way, the milling inserts can "dig themselves" into the material in an efficient and powerful way, and thereby remove large amounts of chips per time unit. In order to generate smooth (usually plane, curved or cylindrical) surfaces, the main edge of the individual cutting edge has to be given a convexly curved or cambered shape as viewed in plane elevation, so that the cutting edge line of the main edge, in spite of the axially positive tipping-in of the milling inserts into the milling cutter body will follow or be tangent to an imaginary cylinder, the diameter of which is determined by the radial distance between the rotation axis of the milling cutter body and the cutting edge line of the main edge. It should also be mentioned that the milling inserts in question, by having at least two serviceable cutting edges, and thereby being indexable, get a service life that is at least twice as large as those milling inserts only having one cutting edge.

A problem with previously known, high-capacity milling inserts (see, for instance, WO/02/055245 A1 and SE 527617 C2) is, however, that the same under certain circumstances may be subjected to vibrations, which, if they become regenerative and are allowed to grow in strength in an uncontrolled way, may lead to drastic consequences, such as tool or machine breakdowns, rejections of expensive workpieces, personal risks of injury, etc. The risk of emergence of vibrations is particularly great when the milling tool is slender and operates using great cutting depths, e.g., in aluminum. As long as the cutting depths are small or moderate (up to 2 mm), initial vibration tendencies usually die out by themselves, but when the cutting depths increase, for instance to ¼ of the length of the cutting edge or more, from which it follows that also the cutting forces are enhanced, it often occurs that the vibrations are fed back and grow in an uncontrolled way. The risk of vibration is particularly marked for tools of steel, such as shank-end mills, the length of which is many times greater than the diameter (L>3×D).

The present invention aims at overcoming the above-mentioned problems and at providing an improved milling insert of the indexable type. An object of the invention to provide a milling insert manufactured from cemented carbide or another hard and wear-resistant material, which has an inherent ability to automatically damp or deaden vibrations as soon as these tend to arise. The ultimate purpose of counteracting the emergence of vibrations is to make it possible to increase the axial cutting depth and thereby the removal volume, without risking damage the tool and/or the machine by escalating vibrations.

Another object of the invention is to realize the vibration damping function by ways that are technically simple and thereby inexpensive.

Yet another object of the invention is to provide a milling insert that is particularly suitable to use in shank-end mills.

SUMMARY OF THE INVENTION

In an embodiment, the invention provides an indexable milling insert, including an upperside, an underside parallel to an imaginary reference plane, and two cutting edges. Each cutting edge includes a cutting edge line and is formed between a chip surface included in the upperside and a first clearance surface extending between the upperside and the underside, the first clearance surface forming an acute, nominal first clearance angle ($\alpha$) with a normal to the reference plane. Each cutting edge includes a main edge, which is at least partly convexly curved as viewed in plane elevation from above, and which extends from an initial end, which determines the maximal cutting depth of the milling insert, to a corner edge having a radius of curvature that is smaller than the radius of curvature of the main edge, the main edge rising in the direction from the initial end toward the corner edge such that the distance thereof to the underside successively increases in the direction. A second clearance surface is formed between the cutting edge line and the first clearance surface, the second clearance surface having a width of at most 0.3 mm and a nominal second clearance angle ($\lambda$) that is smaller than the first clearance angle. The second clearance surface is of uniform width and the second clearance angle decreases successively in the direction from the initial end toward the corner edge.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

Before exemplifying embodiments of the invention are described in more detail, some concepts for the understanding of the nature of the invention should be made clear. Thus, the concept "nominal" clearance angle means that the angle in question only relates to the proper milling insert, i.e., without association to the basic body of the milling cutter. However, if a clearance angle is "effective", reference is made to the angle formed by the same clearance surface in relation to an imaginary cylinder concentric with the center axis of the milling cutter body and touched by the main edge of the milling insert adjacent to the clearance surface.

Furthermore, the concepts "tipping-in" and "tipping-in angle" are used to define the spatial position of the mounted milling insert in the milling cutter body. In practice, this position is determined by how the bottom in that seating of the milling cutter body in which the milling insert is fixed is situated in relation to the center axis of the milling cutter body. It is common in, e.g., shank-end mills for end milling operations, that the bottom of the seating is placed in such a way that the axial and radial tipping-in angles of the milling insert both become positive, which means that the milling insert leans, on one hand, rearward/upward as seen in side view and in relation to the direction of rotation of the tool (axial tipping-in), and, on the other hand, that the same is tilted rearward/inward in the direction of rotation in relation to an imaginary radius from the center axis of the milling cutter body to the periphery thereof (radial tipping-in).

Figure 1:
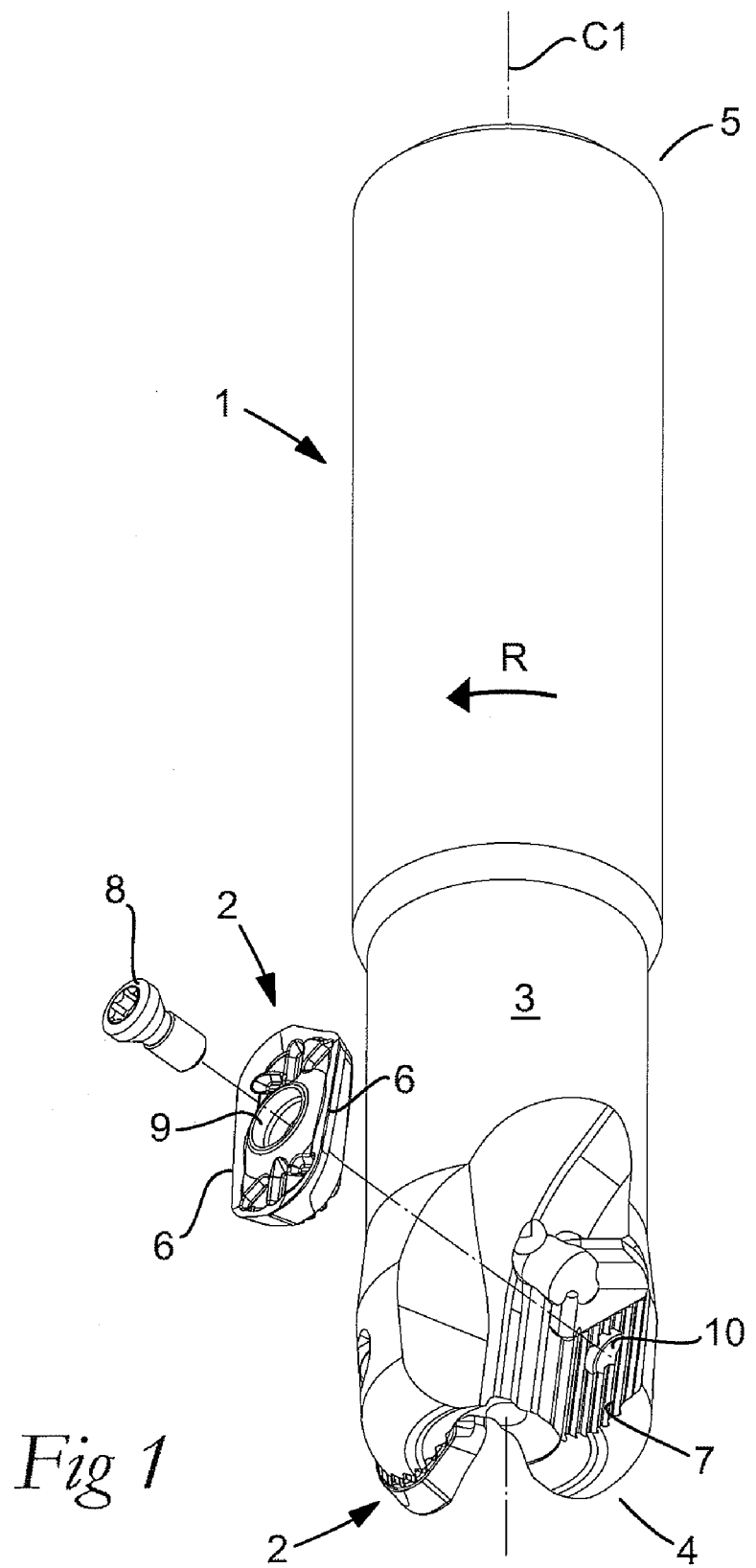
FIG. 1 is a perspective exploded view of a milling cutter in the form of a shank-end mill, which is equipped with two milling inserts according to a first embodiment of the invention.
Figure 2:
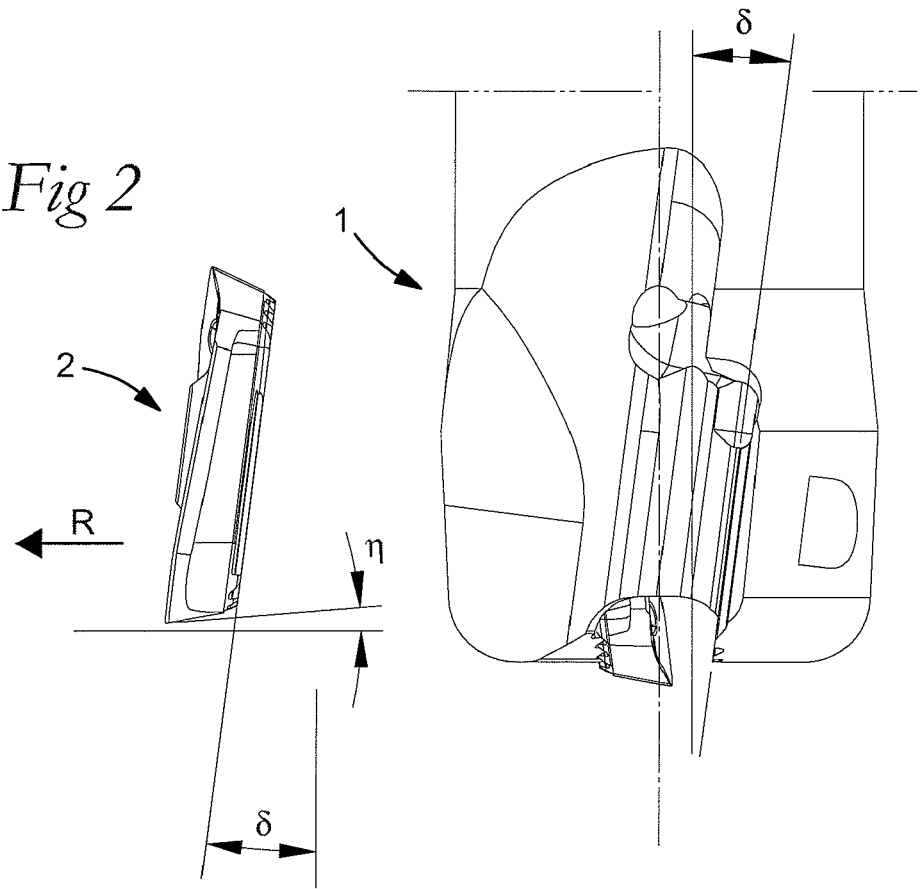
FIG. 2 is an enlarged, exploded side view showing a milling insert and a seating for the same in the milling cutter body.
Figure 3:
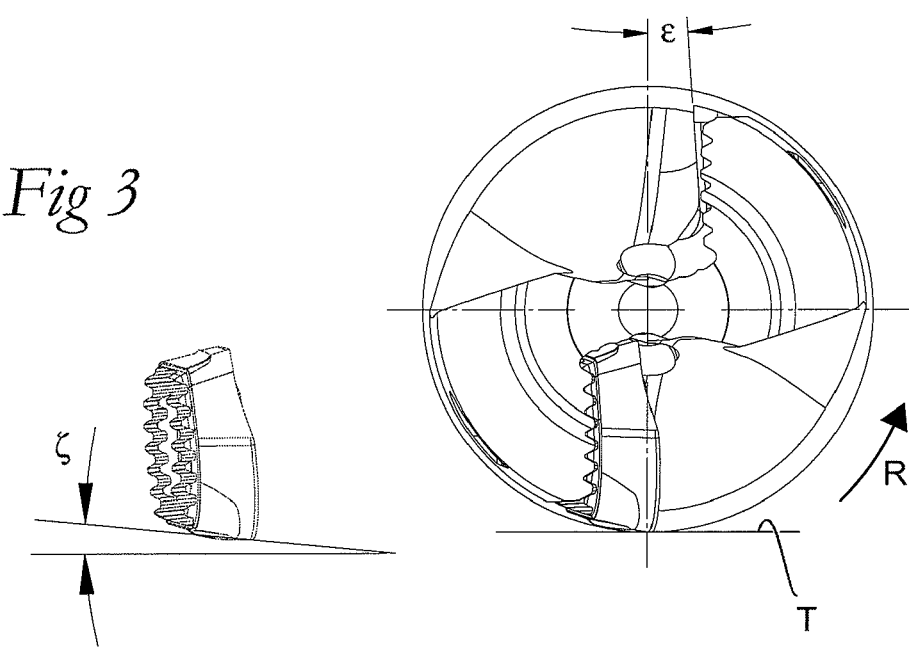
FIG. 3 is an end view of the milling cutter body.

The milling tool shown in FIGS. 1-3 includes a basic body or milling cutter body 1, as well as a number of milling inserts 2. In the example, the milling cutter is in the form of a shank-end mill, which is equipped with two milling inserts. The milling cutter body includes an envelope surface 3 and front and rear ends 4, 5 between which a center axis C1 extends, around which the milling cutter body is rotatable in a predetermined direction of rotation R. The individual milling insert 2, which will be described more in detail below, is indexable by including two alternately usable cutting edges 6. Each milling insert is fixed in a seating recessed in the front end of the milling cutter body, the seating being represented by a bottom 7, which in this case is a so-called serration connecting surface, i.e., a surface in which a plurality of mutually parallel ridges spaced-apart by grooves are included, which ridges can engage the grooves of a corresponding serration connecting surface on the underside of the milling insert 2. In this case, fixation of the milling insert 2 is effected by means of a screw 8, which can be inserted through a through hole 9 in the milling insert and be tightened in a female thread of a hole 10, which mouths in the seating bottom 7.

Figure 4:
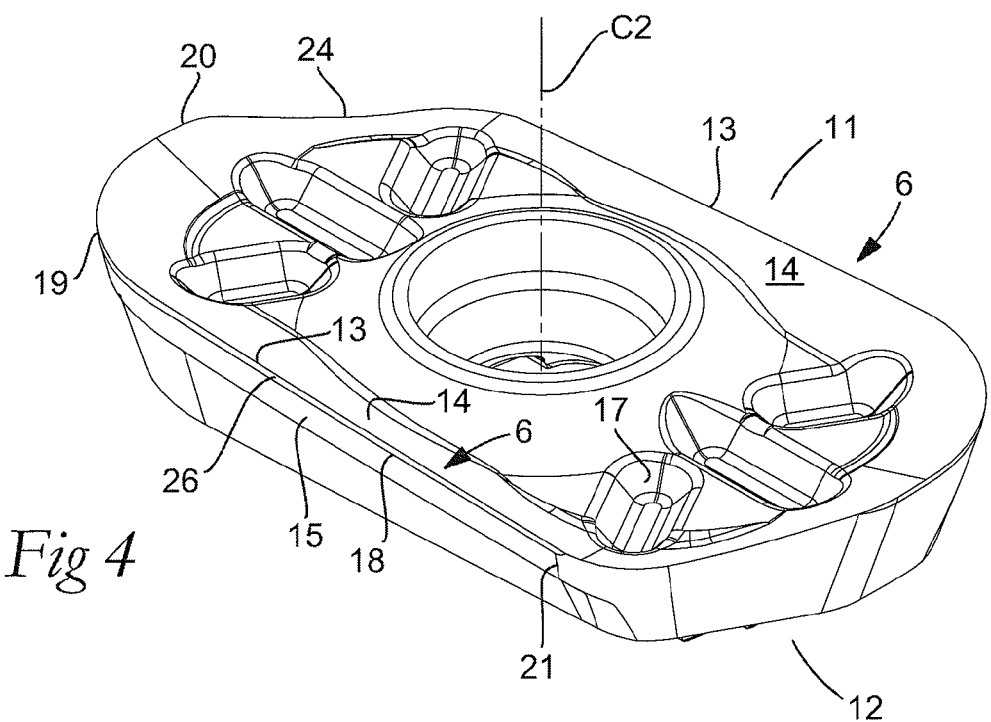
FIG. 4 is an enlarged top side view of only the milling insert according to the embodiment.
Figure 5:
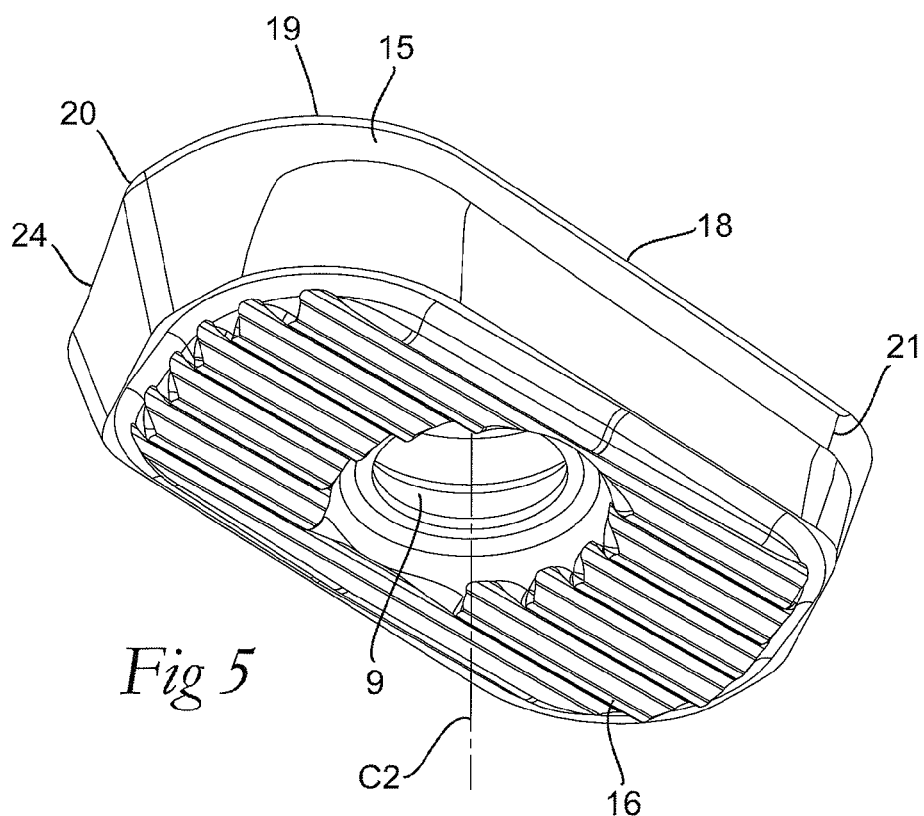
FIG. 5 is a bottom side view of the same milling insert.

Reference is now made to FIGS. 4-7, which illustrate the nature of the proper milling insert 2. Milling insert 2 includes, in addition to the two cutting edges 6, an upperside 11 and an underside 12. In FIGS. 4 and 5, the center axis of the hole 9 is designated C2. Because the two cutting edges 6 are identical and can assume one and the same solid geometrical position in the milling cutter body after indexing of the milling insert by rotation 180° around the center axis C2, only one of them will be described in detail below. Each cutting edge 6 includes a cutting edge line 13 and is formed between a chip surface 14 included in the upperside 11 and a clearance surface 15 extending from the upperside toward the underside.

Figure 7:
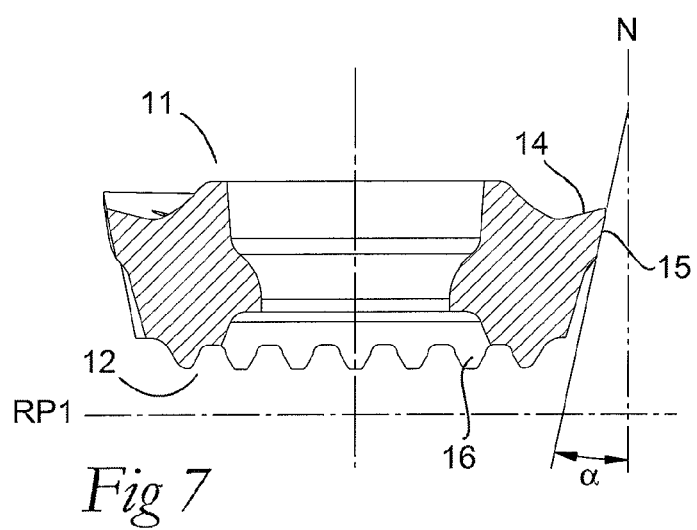
FIG. 7 is a cross section VII-VII in FIG. 6.

As previously mentioned, the underside 12 of the milling insert is in the form of a serration connecting surface, which is formed of a number of straight ridges 16 (see FIGS. 5 and 7), the crests of which are situated in a common plane. In other words, the underside of the milling insert is generally plane. In FIG. 7, it is shown a reference plane RP1 that is parallel to the underside of the milling insert. Furthermore, in FIG. 7, N designates a normal to the reference plane RP1, i.e., a straight line that extends perpendicularly to the reference plane. In relation to the normal N, the clearance surface 15 forms a certain clearance angle $\alpha$, which usually is within the range of 10-20° for the type of milling insert in question. In the example, $\alpha$ amounts to approx. 12°.

In the upperside 11 of the milling insert, a number of depressions 17 are formed, which have been made for reasons of manufacturing technique. It should be pointed out that the same, in all essentials, are situated inside the two peripheral chip surfaces 14.

Figure 8:
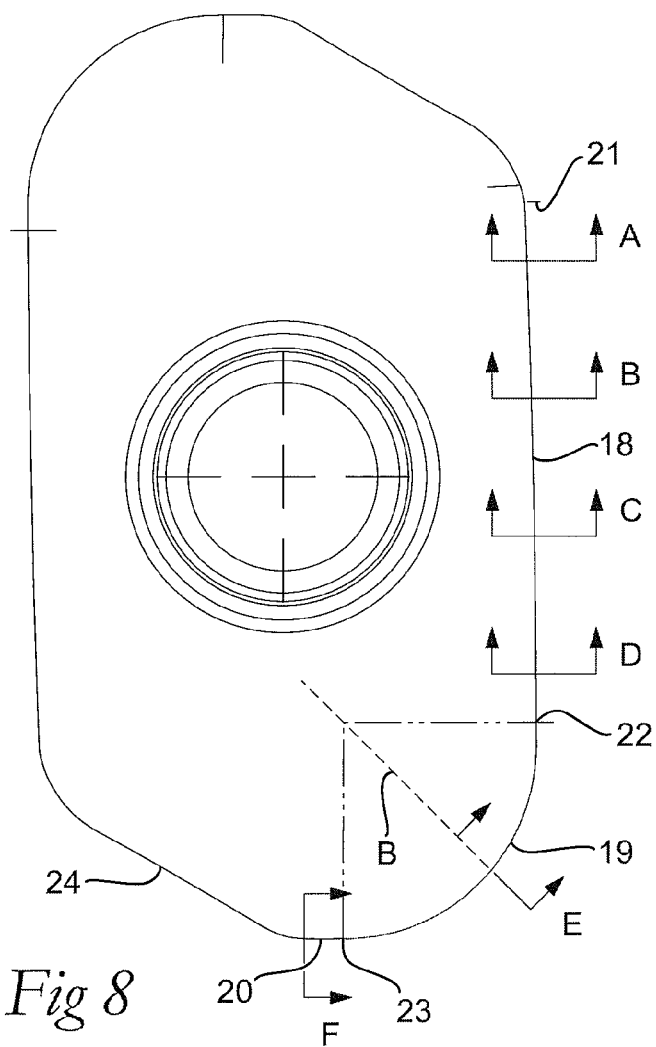
FIG. 8 is a simplified planar view from above showing the contour shape of the milling insert.
Figure 8:
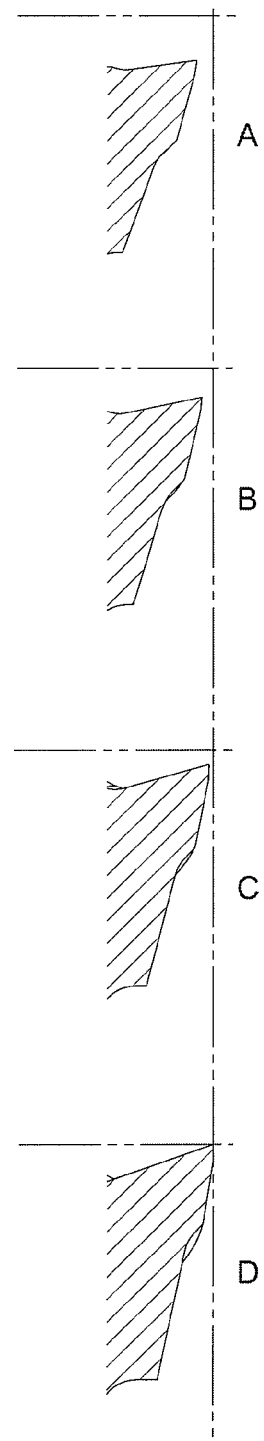
Figure 8A:
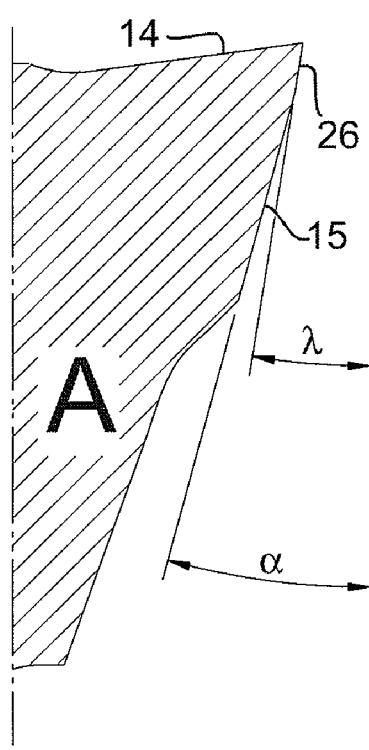
FIGS. 8A-F are enlarged detailed sections A, B, C, D, E and F in FIG. 8.
Figure 8B:
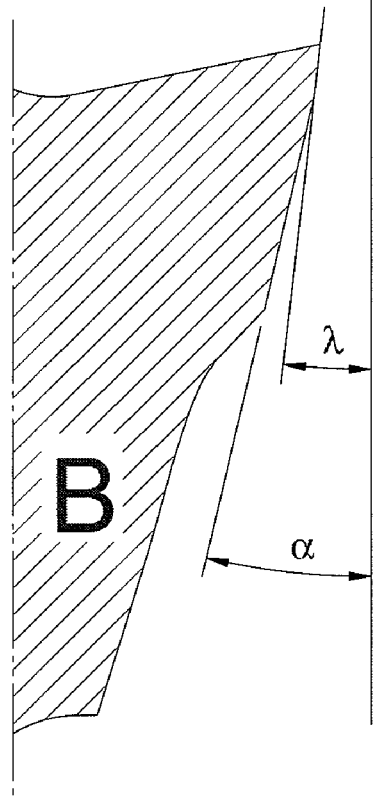
Figure 8C:
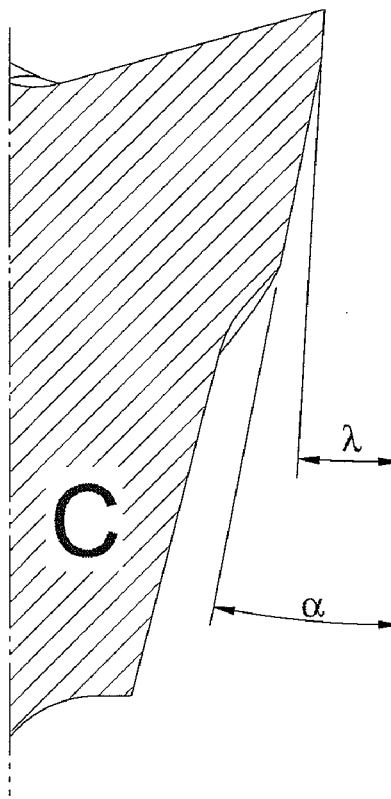
Figure 8D:
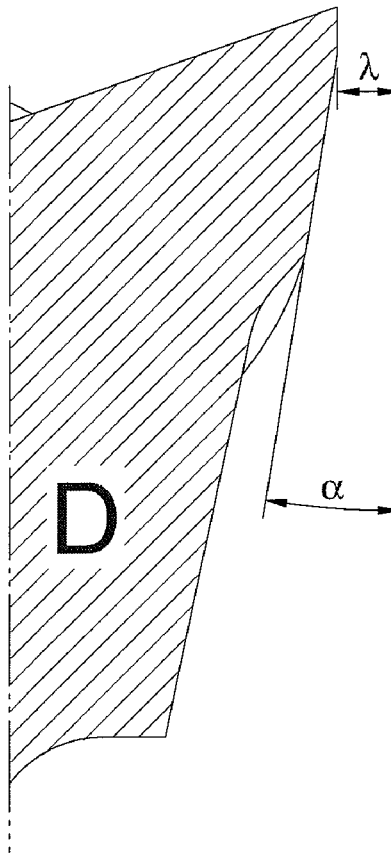
Figure 8E:
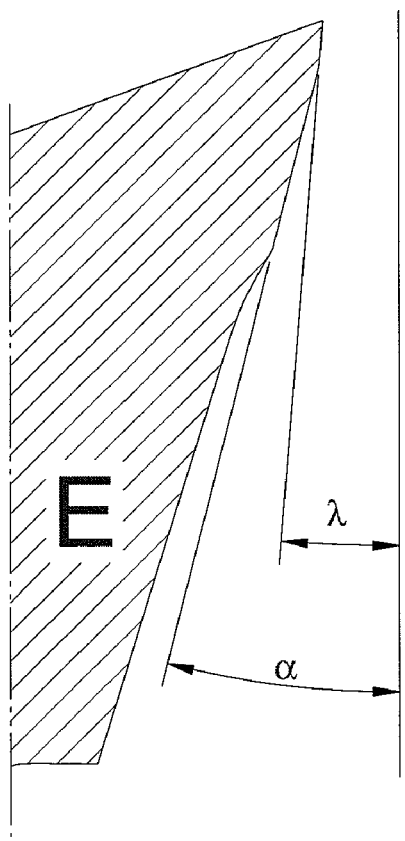
Figure 8F:
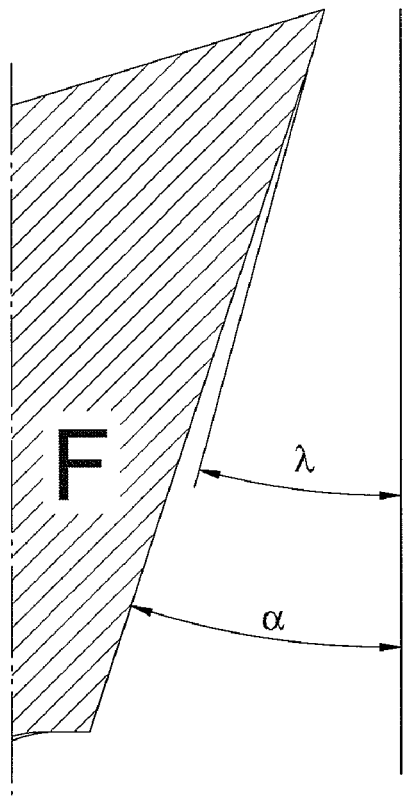

Generally, the milling insert 2 has an elongate basic shape. Each individual cutting edge 6 includes a plurality of part edges (see FIG. 6), viz. a main edge 18, a corner edge 19 as well as a surface-wiping secondary edge 20, the main edge 18 of which extends from an initial end 21 to a point 22 where the same transforms into the corner edge 19. The corner edge 19 extends, in turn, from the transition point 22 to a point 23 where the same transforms into the surface-wiping secondary edge 20. As seen in planar view from above according to FIG. 6, the main edge is slightly convex, although the radius of the arch is so great that the convexity is not visible to the naked eye. Also the corner edge 19 is convexly curved as seen in planar view, but by a radius that is much smaller than the radius of curvature of the main edge 18. As seen in FIG. 8, the corner edge 19 has essentially the shape of a quarter of a circle, which is divided into two equally large halves by a bisector B. The secondary edge 20 (see again FIG. 6) is utmost slightly convex (but appears as straight to the naked eye in FIG. 6) and extends generally transversely to the longitudinal axis L of the milling insert. This longitudinal axis L is parallel to the ridges 16 on the underside of the milling insert. The secondary edge 20 transforms, in turn, into an additional cutting edge 24, which extends at an acute angle β to a reference plane RP2 perpendicular to the longitudinal axis L. The angle β may advantageously be within the range of 25-35°, and amounts in the example to approx. 31°. This cutting edge 24 may be utilized for so-called ramping operations, and is therefore henceforth denominated ramping edge.

Figure 6:
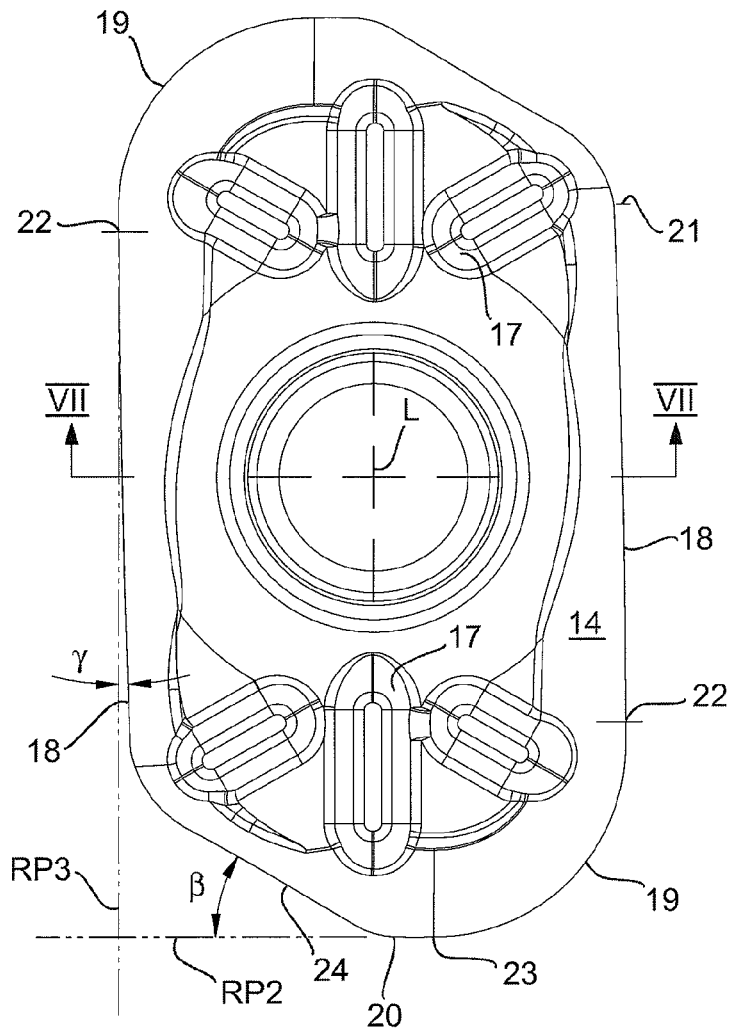
FIG. 6 is a planar view from above of the milling insert.

In FIG. 6, it is furthermore seen that the individual main edge 18 is tilted at a certain, moderate angle γ in relation to a reference plane RP3 parallel to the longitudinal axis L, which is tangent to the transition point 22 between the main edge 18 shown to the left and the corner edge 19 in extension of the same. As may be seen in FIG. 4, the milling insert is furthermore formed in such a way that the main edge 18 rises from the initial end 21 toward the corner edge 19 so far that the vertical distance between the cutting edge line 13 and the underside 12 of the milling insert successively increases in the direction from the point 21 toward the corner edge 19. Conversely, the ramping edge 24 declines from the secondary edge 20 to the initial end 21 of an adjacent (inactive) cutting edge 6. Furthermore, it should be noted that the main edge 18 is slightly concavely curved as seen in side view.

For the sake of clarity, it should be pointed out that the angle γ is defined between, on one hand, the reference plane RP3 and, on the other hand, an imaginary, straight chord line between the two end points 21, 22 of the slightly convex main edge 18.

Reference is now made again to FIGS. 1-3, from which it is seen that the seating bottom 7 is situated in such a way in the milling cutter body 1 that the milling insert 2, in the mounted state, obtains an axially positive tipping-in angle δ, as well as a radially positive tipping-in angle ε. In spite of the radial tipping-in ε, the milling insert will clear from the generated surface thanks to the comparatively great, nominal clearance angle α. The effective clearance angle ζ in relation to the tangent line T may, roughly seen, be said to be the difference between α and ε. In an analogous way, the secondary edge 20 obtains an effective clearance η, which, roughly seen, is the difference between the nominal clearance angle (lacks designation) of the milling insert adjacent to the secondary edge 20 and the axial tipping-in angle δ. However, in practice, the axial tipping-in and radial tipping-in influence each other mutually in such a way that the exact clearance angles cannot be calculated merely by simple subtraction.

Figure 10:
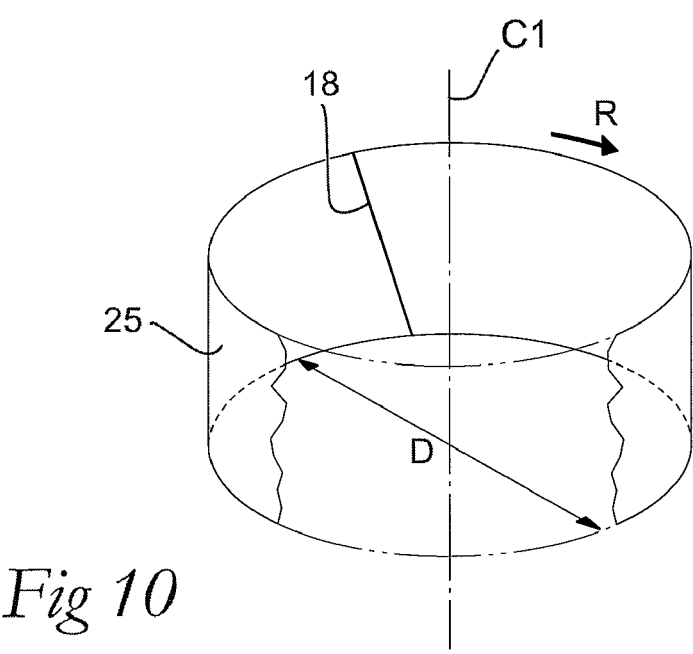
FIG. 10 is a schematic perspective view illustrating an imaginary cylinder along which the main edge of the milling insert moves during the rotation of the milling cutter.

Now reference is made to the schematic picture in FIG. 10, where 25 designates an imaginary cylinder that is generated by the main edge 18 of the milling insert when the same rotates in the direction R around the center axis C1 of the milling cutter body (cf. FIG. 1). The diameter D of this cylinder 25 is determined by the radial distance between the center axis C1 and the main edge 18. Thanks to the fact that the cutting edge line of the main edge 18 is slightly convex, each point along the same will be located along the cylinder 25, in spite of the milling insert, and thereby the main edge, being tilted at the axial tipping-in angle δ.

As has been described hitherto, known milling inserts tend to, in the state thereof as mounted in the milling cutter body, give rise to regenerative vibrations, which may cause machine and tool breakdowns. The risks of vibration become particularly great when the milling cutter body is slender and manufactured from steel or another relatively soft, flexible material (e.g., in comparison with cemented carbide). Therefore, the risk becomes particularly great in shank-end mills of the exemplified kind, where the proper milling cutter body may have a length of 3×D or more.

Figure 9:
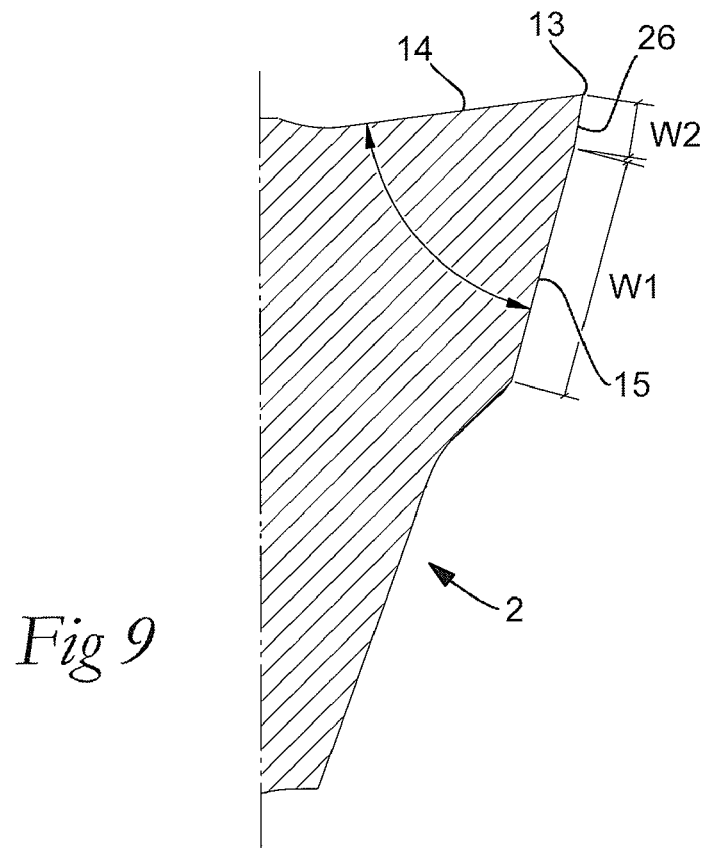
FIG. 9 is an additional detailed section showing the width measures of two clearance surfaces adjacent to the main cutting edge of the milling insert.

In order to obviate or counteract the risk of uncontrollable vibrations, the milling insert according to the invention has been formed with a second clearance surface 26 between the first-mentioned clearance surface 15 and the cutting edge line 13 (see FIGS. 4, 5 and 9). Characteristic of this second clearance surface 26 is that the same is essentially of uniform width along the length extension thereof and that the nominal clearance angle λ thereof successively decreases from the initial end 21 of the main edge 18 toward the corner edge 19. The width W2 (see FIG. 9) of the clearance surface 26 should, on one hand, amount to at most 0.3 mm, and, on the other hand, to at least 0.05 mm. Suitably, W2 is within the range of 0.10-0.20 mm. In practice, the second clearance surface 26 should be provided by grinding in order to, together with likewise ground flanks of the ridges of the serration connecting surfaces 7, 12, ensure a meticulously accurate positioning of the cutting edge line of the main edge 18 in relation to the center axis of the milling cutter body.

In addition, the nominal clearance angle of the second clearance surface 26 is smaller than the clearance angle α of the first clearance surface 15 and decreases successively in the direction from the initial end 21 toward the corner edge 19.

In order to illustrate the clearance angles of the clearance surfaces 15, 26 in different portions along the cutting edge, reference is made now to FIGS. 8 and 8A-F. In these figures, the clearance angle of the first clearance surface 15 is still designated α, while the clearance angle of the second clearance surface 26 is designated λ. Below, a table follows showing how the respective clearance angles as well as the difference between the same varies in the different sections.

| Section | λ | α | Angular difference |
|---|---|---|---|
| A | 9.19° | 15.13° | 5.94° |
| B | 6.63° | 13.11° | 6.48° |
| C | 3.34° | 11.09° | 7.75° |
| D | 0.01° | 9.11° | 9.10° |
| E | 4.69° | 14.21° | 9.52° |
| F | 15.16° | 18.11° | 2.95° |

As is seen from the table, λ as well as α decreases in the direction from the initial end 21 of the main edge 18 (section A) toward the transition 22 to the corner edge 19. However, the decrease of λ is proportionally greater than the decrease of α, which means that the difference between the two angles increases in the direction from section A to section D. It should furthermore be noted that λ approaches zero in the area of the transition 22 (see section D) to subsequently increase along the corner edge 19, i.e., in the direction from the transition 22 toward the transition 23 to the secondary edge 20. The fact that the angle λ is again allowed to increase along the corner edge 19 is conditioned by the general construction demands that are made on the milling insert, emphasis being put on the fact that the vibration damping effect of the surface 26 is of high importance along the main edge 18, but of less importance along the corner edge 19 (in particular along the part that extends between the bisector B and the transition point 23).

In the example shown, the second clearance surface 26 extends not only along the main edge 18 in its entirety, but also along the corner edge 19 as well as the surface-wiping secondary edge 20. This preferred design is primarily conditioned by reasons of manufacturing technique, so far that a second clearance surface is easy to grind all the way from the starting point 21 to the secondary edge 20. However, the effective vibration damping, which is provided by the clearance surface 26, is primarily obtained along at least parts of the main edge 18. Thus, the clearance surface 26 should extend along the greater part of the main edge 18 from the point 22 toward the point 21. Advantageously, the surface 26 also extends along at least the part of the corner edge 19 that is present between the point 22 and the bisector B.

Figure 11:
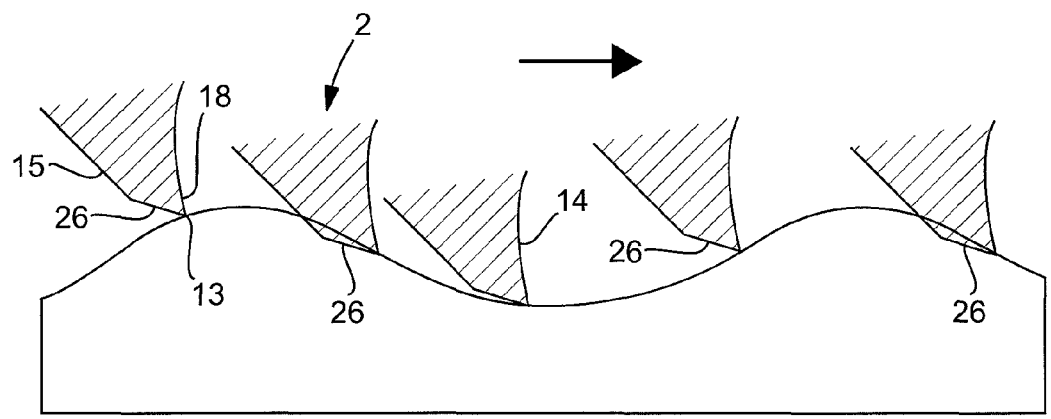
FIG. 11 is a schematic detailed picture that illustrates the function of the embodiment.

In order to further elucidate the vibration damping effect of the second clearance surface 26, reference is now made to FIG. 11. There, it is shown how the surface generated by the main edge 18 of the milling insert in a workpiece becomes generally waved, if the tool begins to vibrate. Furthermore, it is schematically shown how the milling insert moves along the waved surface, the undulation of which essentially resembles the (sinus-shaped) formation obtained upon milling in aluminum. Thus, to the left in FIG. 11, it is seen how only the cutting edge line 13 of the main edge has contact with the wave surface, when the milling insert moves in the upward direction (strictly speaking radially outward from the workpiece) toward a wave crest. In doing so, the clearance behind the cutting edge line is relatively great, which, among other things, means that the generation of heat is moderate. However, when the milling insert moves downward from a wave crest toward a wave trough, the clearance surface 26 will obtain contact with the wave surface and skid along the same. In such a way, the vibration tendencies are damped, which could be developed if the milling insert in the traditional way would be freely movable in relation to the wave surface. In this connection, the milling insert instantaneously will generate more heat than in the preceding position, but because the width W2 of the surface 26 is limited (max 0.3 mm), the generation of heat will be short-lived and thereby controllable. Namely, when the cutting edge line 13 of the milling insert reaches the wave trough, the clearance surface 26 has lost contact with the wave surface, i.e., the clearance behind the cutting edge line is again established. During the continued movement of the milling insert in the direction of the arrow, the effective clearance increases up to the next wave crest, after which the slender clearance surface 26 again will skid against the wave surface. In other words, the slender clearance surface 26 provides a periodically repetitive damping of occurring tendencies to vibrations, without, because of this, complicate the cutting process by too an intense generation of heat.

As is seen in FIG. 9, the width W1 of the first clearance surface 15 is, in this case, greater than the width W2 of the second clearance surface 26. However, the width W1 of the first clearance surface 15 is incidental. The important thing is that the width W2 of the second clearance surface 26 is limited and essentially equally great along the entire length extension of the surface along the cutting edge line. Thus, W2 should amount to at least 0.05 mm (to give the desired damping effect) and at most 0.30 mm (in order not to give too great of a generation of heat). Suitably, W2 should be within the range of 0.08-0.25 mm, or 0.10-0.20 mm. By selecting the nominal clearance angles $\lambda$, $\alpha$ of the milling insert in accordance with the above table, very moderate effective clearance angles are obtained. In the mounted state of the milling insert, the effective clearance angle of the clearance surface 26 (lacks reference designation since the scale in FIG. 3 does not allow drawing of said angle) will be within the range of 0.01-1.5°, and be essentially equally great along the entire main edge, more precisely as a consequence of $\lambda$ successively decreasing from the initial end 21 toward the corner edge 19 in the way previously described. Advantageously, the effective and constant clearance angle of the surface 26 should amount to at least 0.1° and at most 1.2°. Most suitably, the angle is within the range of 0.8-1.2°.

The milling insert known by SE 527617 C2 is per se formed with a so-called clearance bevel between the chip-removing cutting edge line of the main edge and the traditional clearance surface adjacent to the main edge, the clearance bevel being said to have a width of at least 0.05 mm and at most 0.30 mm. However, the purpose of this clearance bevel is exclusively to reinforce the cutting edge, more precisely in a uniform way along the peripheral extension thereof. For this reason, the clearance angle of the clearance bevel becomes equally great in all points along at least the main edge, which in turn is something that means that the width of the clearance bevel varies, more precisely in such a way that it decreases along a part of the main edge in the direction of the corner edge. Therefore, if it is hypothetically assumed that a person skilled in the art should try to utilize the known milling insert with the purpose of overcoming the vibration problems, the varying width of the reinforcing clearance bevel would give rise to problems, e.g., with burr formation on the machined material (for instance aluminum) and sticking of working material on the milling insert. This also gives rise to an increased generation of heat. Thus, the broadest section of the clearance bevel, which is active when the cutting depth is great, would cut into the wave crests (cf. FIG. 11) so deep and so long that greater amounts of heat are generated as well as that said problems with burr formation and sticking arise, which jeopardizes a good machining result.

Figure 12:
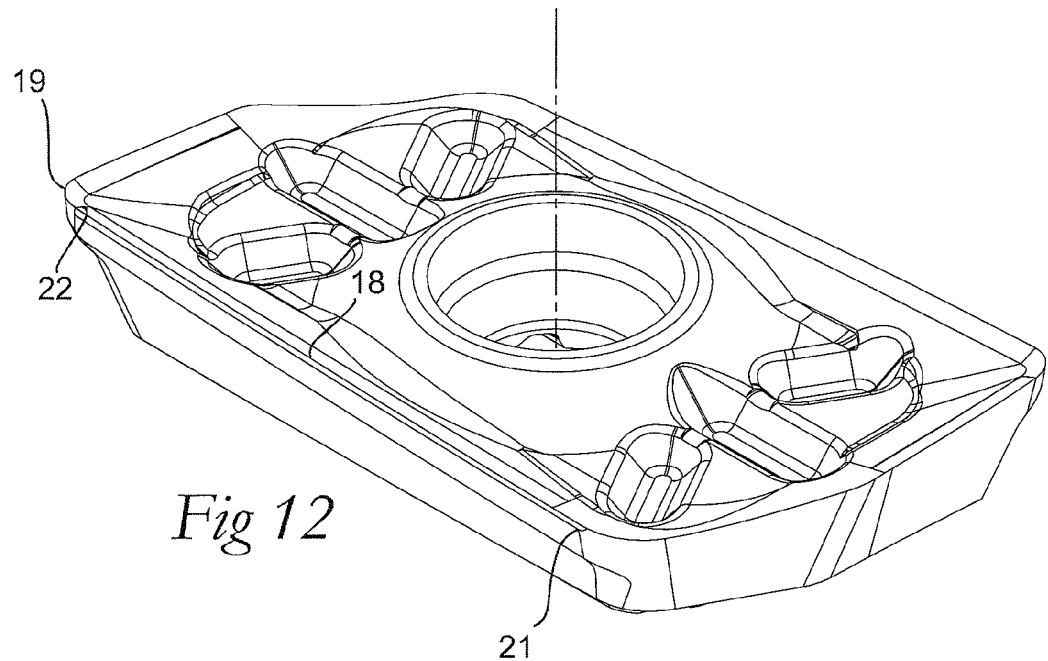
FIG. 12 is a top side view showing an alternative embodiment of the milling insert according to the invention.
Figure 13:
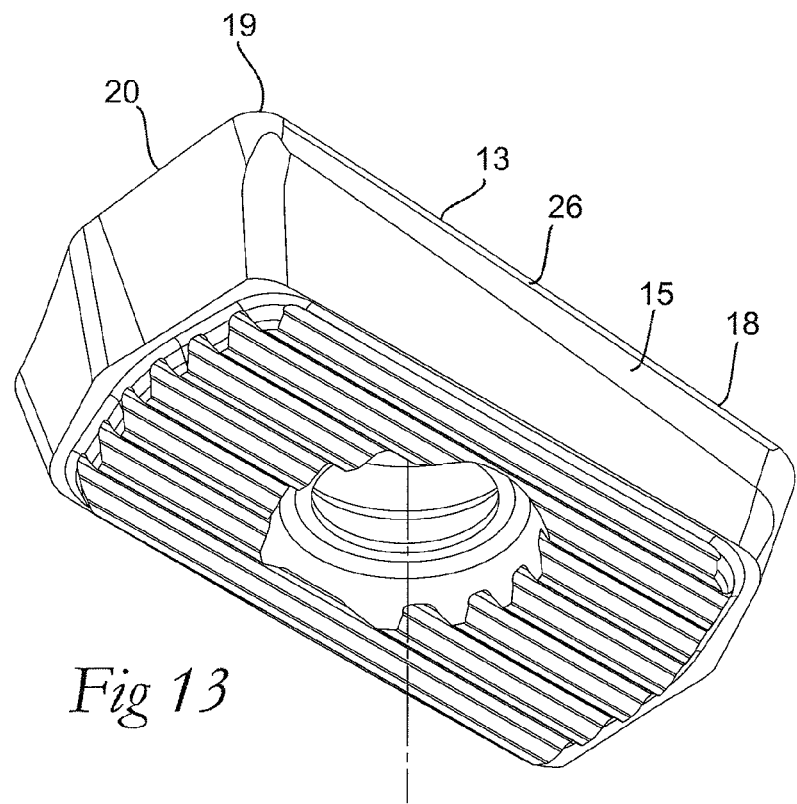
FIG. 13 is a bottom side view of the milling insert according to FIG. 12.

In FIGS. 12 and 13, an alternative embodiment of the milling insert according to the invention is shown, which differs from the previous embodiment in that the corner edge 19 has a considerably smaller radius and a shorter extension than in the preceding case. In other respects, a second clearance surface 26 is formed between a first clearance surface 15 and the cutting edge line 13 of the main edge 18. However, in this case, the surface 26 extends only along the main edge 18, i.e., not along the corner edge 19 and the surface-wiping secondary edge 20, respectively. As a consequence of the corner edge 19 being small, however, the clearance surface 26 in a reliable way will damp vibration tendencies also at small cutting depths. It should be pointed out that the main edge 18 also in this case is slightly convex as seen in planar view (not visible to the eye) and rises in relation to the underside of the milling insert from the initial end 21 toward the transition 22 to the corner edge 19.

While the invention has been disclosed with reference to certain preferred embodiments, numerous modifications, alterations, and changes to the described embodiments are possible without departing from the sphere and scope of the invention, as defined in the appended claims and their equivalents thereof. For example, the milling insert may be formed so that it can be fixed in the milling cutter body in other ways than by a screw. For example, the milling insert may be manufactured without any through hole. It is also possible to form the connecting surface on the underside of the milling insert in other ways than in the form of a serration surface having only straight, parallel ridges. Thus, the connecting surface may be of the type that locks the milling insert in more than one coordinate direction. Neither need the cutting edges of the milling insert include any ramping edge of the shown kind. Furthermore, the milling insert may be made with more than two cutting edges. Accordingly, it is intended that the invention not be limited to the described embodiments, but that it have the full scope defined by the language of the following claims.

What is claimed is:

1. An indexable milling insert, comprising:
an upperside, an underside parallel to an imaginary reference plane, and two cutting edges,
each cutting edge including a cutting edge line and being formed between a chip surface included in the upperside and a first clearance surface extending between the upperside and the underside, the first clearance surface forming an acute, nominal first clearance angle ($\alpha$) with a normal to the reference plane,
each cutting edge including a main edge, which is at least partly convexly curved as viewed in plane elevation from above, and which extends from an initial end, which determines the maximal cutting depth of the milling insert, to a corner edge having a radius of curvature that is smaller than the radius of curvature of the main edge, the main edge rising in the direction from the initial end toward the corner edge such that the distance thereof to the underside successively increases in said direction, and
a second clearance surface being formed between the cutting edge line and the first clearance surface, the second clearance surface having a width of at most 0.3 mm and a nominal second clearance angle ($\lambda$) that is smaller than the first clearance angle,
wherein the second clearance surface is of uniform width and the second clearance angle decreases successively in the direction from the initial end toward the corner edge.

2. The milling insert according to claim 1, wherein the second clearance angle amounts to at most 10°.

3. The milling insert according to claim 1, wherein the second clearance surface extends along the entire main edge from the initial end thereof toward a transition thereof to the corner edge.

4. The milling insert according to claim 1, wherein the second clearance surface extends not only along the main edge but also along at least a part of the corner edge.

5. The milling insert according to claim 1, wherein, from a transition between the main edge and the corner edge, the second clearance angle increases not only along the main edge, but also along the corner edge.

6. The milling insert according to claim 5, wherein the second clearance angle approaches zero at the transition between the main edge and the corner edge.

7. The milling insert according to claim 1, wherein a difference between the first clearance angle and the second clearance angle increases successively in the direction from the initial end toward the corner edge.

8. The milling insert according to claim 1, wherein at least the second clearance surface is ground.

* * * * *